Dec. 6, 1949 H. O. IRMSCHER 2,490,056
MEASURING DEVICE USING A ROTATING TRAP CHAMBER
HAVING A VARYING PERIPHERAL SPEED
Filed Aug. 24, 1943 4 Sheets-Sheet 3
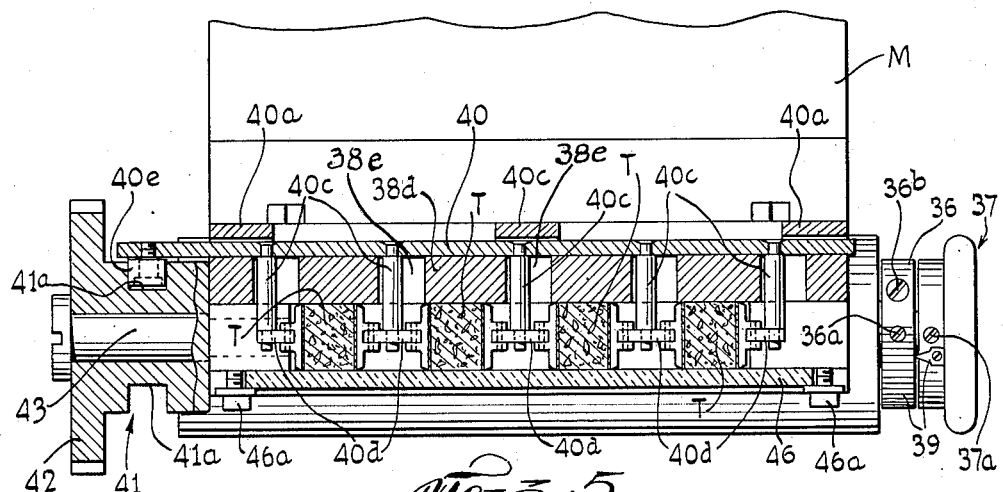
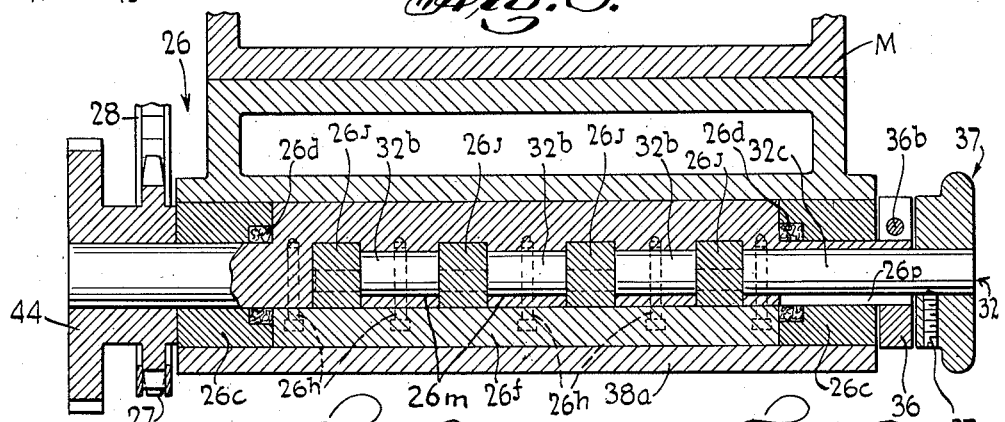
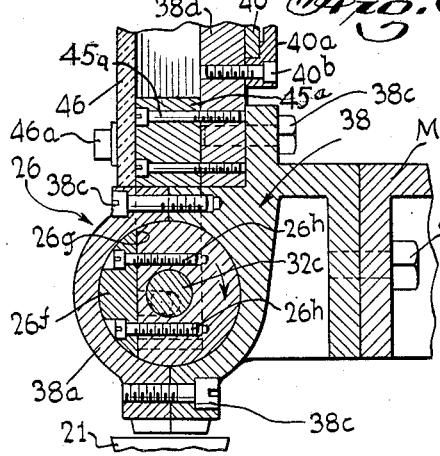
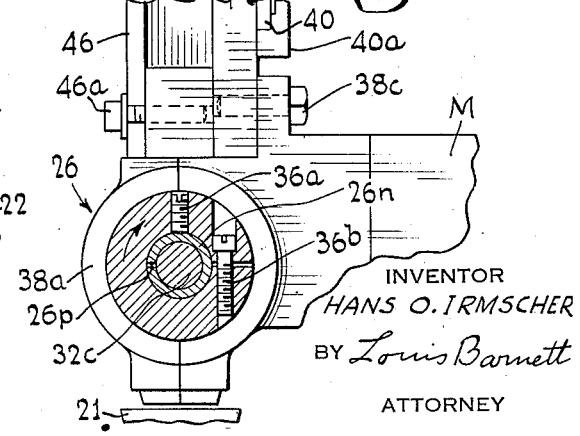
INVENTOR
HANS O. IRMSCHER
BY Louis Barnett
ATTORNEY

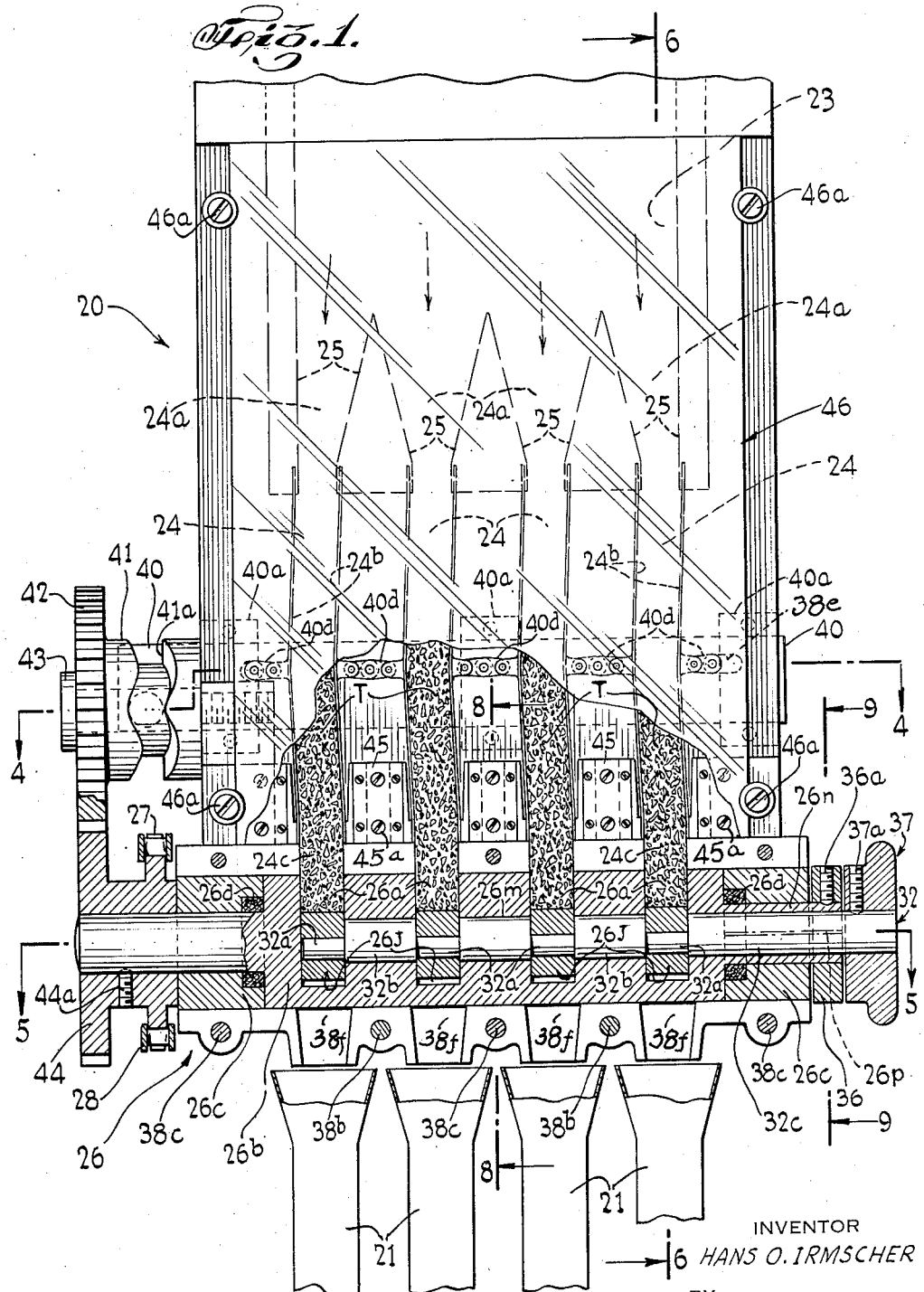

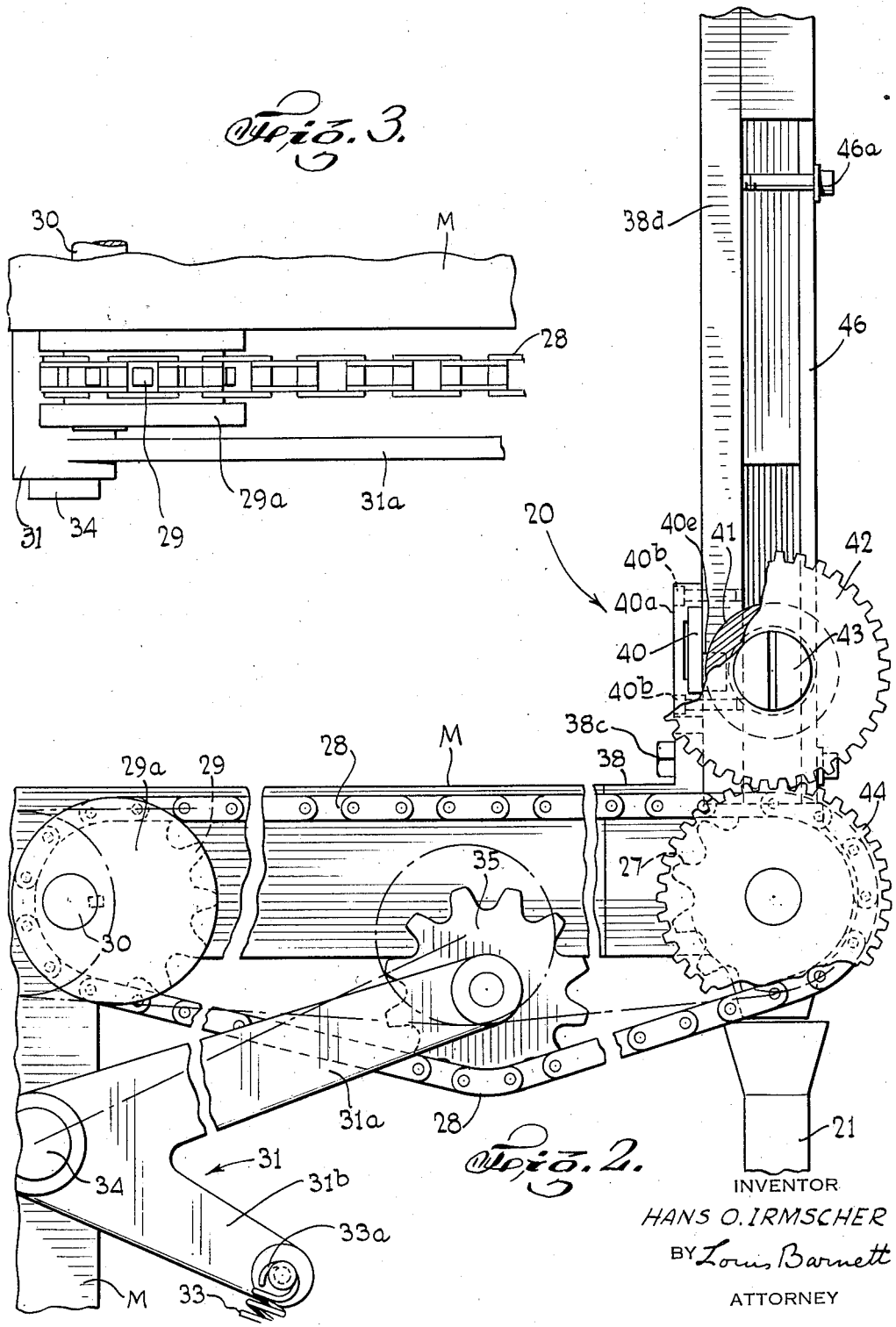

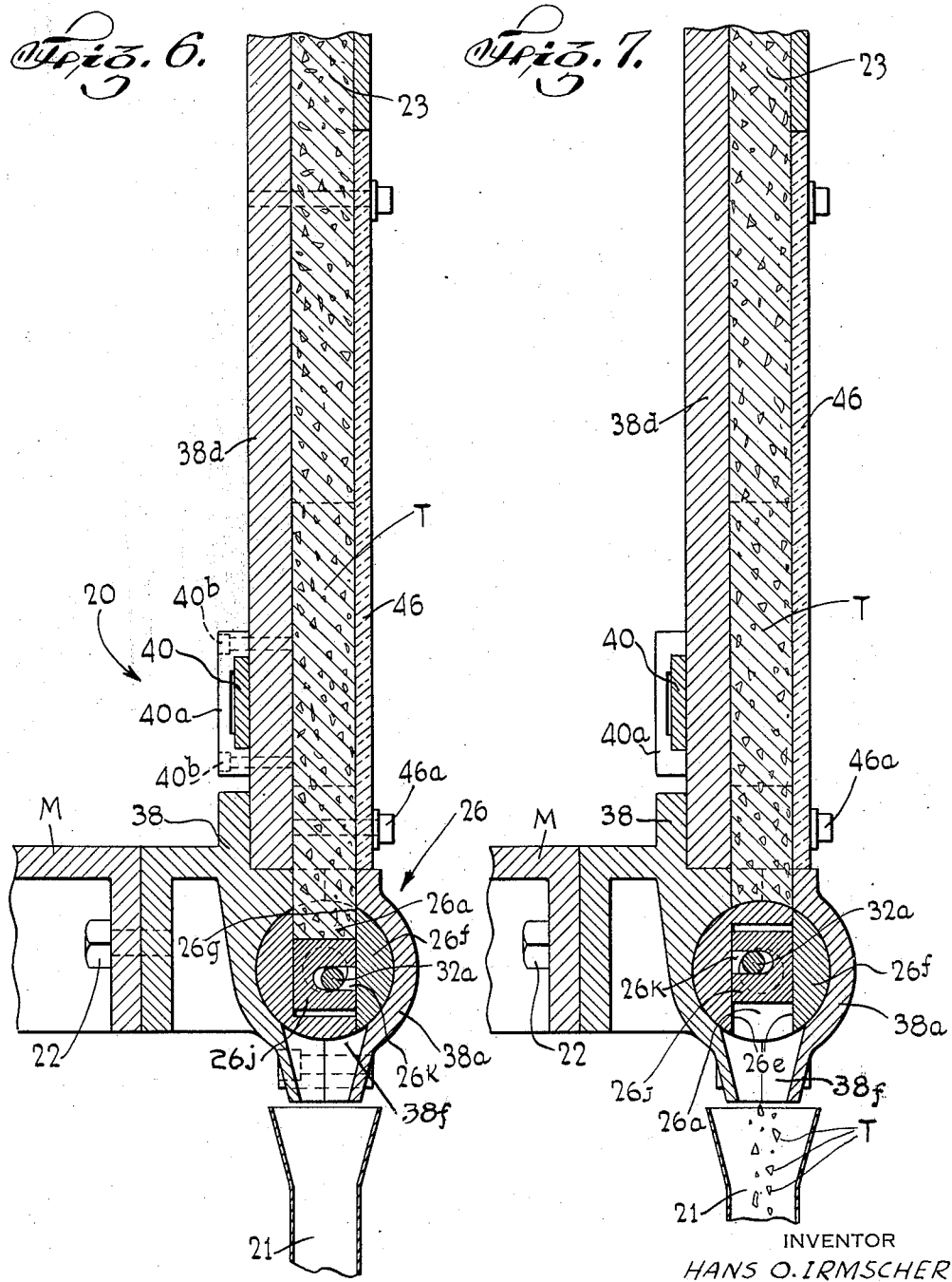

Patented Dec. 6, 1949

2,490,056

UNITED STATES PATENT OFFICE 2,490,056

MEASURING DEVICE USING A ROTATING TRAP CHAMBER HAVING A VARYING PERIPHERAL SPEED

Hans O. Irmscher, East Hempstead, N. Y., assignor to National Urn Bag Co., Inc., Long Island City, N. Y., a corporation of New York Application August 24, 1943, Serial No. 499,802

11 Claims. (Cl. 222—233)

1

The present invention relates to measuring filler apparatus for fluent material in manufacturing packages and the like, and more particularly is directed to mechanisms for delivering or feeding to automatic infusion package making and filling machines, tea, coffee, etc. in predeterminated quantities or charges from a suitable bulk source.

In the manufacture of infusion packages, such as teaballs and the like, using automatic machines in large scale production, measured quantities of tea or other filling material must be intermittently fed to the package bags being manufactured from a bulk supply source while preserving at all times the fluent condition of the filling material. The present invention provides an improved mechanism to successfully give results of the character described adapted for use in connection with super high-speed packaging machines.

Among the objects of the invention is to provide a mechanism of the character described which shall comprise relatively few and simple parts that are easily assembled and incorporated in the construction of automatic machines for making complete fusion packages, or the like, which shall maintain a supply of predetermined quantities of filler or charges with certainty and reliability, which shall operate smoothly and be substantially free from vibration, which shall be inexpensive to construct yet capable of large output capacity in super high-speed machines, and which shall be practical and efficient to a high degree in use.

Other objects and advantages will be in part obvious and in part hereinafter pointed out.

Fig. 1 is a front elevational view of a supply feed measuring mechanism constructed to embody the invention adapted to be applied as a filler to a super high-speed package manufacturing machine, partly broken away to expose the interior constructions.

Fig. 2 is a side elevational view of the improved mechanism shown in Fig. 1.

Fig. 3 is a fragmentary top view of the eccentrically mounted sprocket drive portion shown in Fig. 2.

Figs. 4, 5, and 6 are cross-sectional views taken on lines 4—4, 5—5, and 6—6, respectively, on Fig. 1.

Fig. 7 is a cross-sectional view similar to Fig. 6 showing the position of the parts when the measuring receptacle is in full discharging position; and Figs. 8 and 9 are fragmentary cross-sectional

2 views taken on lines 8—8 and 9—9, respectively, in Fig. 1 showing the assembly and quantity adjustment details, respectively.

Referring in detail to the drawing, 20 denotes an improved feed or charge measuring mechanism constructed to embody the invention which may be incorporated in a super high-speed fully automatic machine for making complete filled packages, such as tea-balls and like articles in large scale production, in the manner more fully described in applicant's inventions Ser. Nos. 450,289, now Patent No. 2,475,617, issued July 12, 1949, and 486,196, which has become abandoned, filed July 9, 1942 and May 8, 1943, respectively for Infusion package manufacture and filler apparatus for measuring a feed supply in packaging fluent products, respectively, copending.

As seen from Figs. 1, 2, 5 and 6, the packaging machine is here indicated by a fragmentary supporting frame portion M which locates the improved mechanism 20 in a proper position for receiving a controlled bulk supply of a fluent product, such as tea, T, to be packaged, and delivered in successive measured charges to bags in the manufacture of tea-balls or the like through suitable stationary funnels or spouts 21, said mechanism 20 being secured to said machine frame supporting portion M in any suitable manner as by bolts 22, shown in Figs. 6 and 8.

The complete mechanism 20 may include a control supply chamber 23 of adequate capacity from which the fluent material, T, being packed in the form of tea-balls is automatically drawn as required for continuous operation of the packaging machine, as for example as shown and described in said copending applications. The bottom or lower end of said chamber 23 may communicate with upper inlet ends 24a of a plurality of branch channels 24 through downwardly tapered intake chutes 25.

As here shown four channels 24 construction is used, it being understood that any number of channels 24 from one to as many as required may be utilized in practicing the invention. The opposite side walls 24b of each channel 24 below the chutes 25 may be made so as to permit being flexed for vibration by a suitable shimmying or shaker means connected to mid-portions thereof for agitating the fluent material T passing therethrough to retain the flow condition thereof and to insure against clogging, the upper ends of said side walls being fixedly secured to said intake chutes 25. Lower outlet ends 24c of each channel 24 passes the fluent material T to measuring devices 26 each of which discharges uniformly measured quantities of fluent material T through spouts 21 for filling bag passing through the packaging machine.

The fluent material T as it leaves each of the channel outlet ends 24c and in passing through measuring devices 26 flows into spaced receptacles 26a provided in cylinder member 26b of devices 26. Said member 26b is mounted to rotate continuously in spaced bearing blocks 26c each having a packing gland 26d as shown in Figs. 1 and 5, and is turned through a suitable variable speed drive, such as driven sprocket 27 secured to said member 26b and chain 28 connecting with an intermediate sprocket 29 having an eccentric hub 29a mounted to turn with a main shaft 30 driven in timed relation from a power transmission operating the packaging machine in any well understood manner. The packing gland 26d forms a seal to keep oil and other foreign matter from reaching into receptacles 26a.

As shown in Figs. 2 and 3, the variable speed drive through chain 28 requires a continuous slack take-up, as for example, idler sprocket 35 which is mounted to turn on arm 31a of a rock lever 31, said lever being pivoted at 34 to the machine frame M and being urged into effective position against the force of a suitable coil tension spring 33 which is indicated as having one end of the spring 33a secured to another arm 31b of lever 31, the other spring end (not shown) being anchored to a relatively fixed part of the machine frame M in the well understood manner.

The spaced receptacles 26a in cylinder member 26b of device 26 are each formed to provide a slideway side walls 26e, and preferably has at least one segment 26f forming one of said walls of each slideway 26e made of an extremely hard steel, or the like material, so the peripherial edge 26g thereof may serve as a cutter in the manner hereinafter described. The other segment portions of cylinder member 26b may be made of another metal brazed or bolted, as at 26h, to cutter segment 26f as indicated in Figs. 6 and 8.

The slideway 26e forming each receptacle 26a carries therein an adjustable bottom piece 26j which when in adjusted position determines the capacity or measured charges desired. In order to set the adjusted capacity of each receptacle 26a, each bottom piece 26j is provided with an open slot 26k through which extends a crank portion 32a of an inner shaft 32 fitted within an axial bore 26m provided in cylinder member 26b, the shaft 32 has spaced bearing portions 32b between the crank portions 32a fitted into the bore 26m so that the crank portions 32a extend in eccentric relation with respect to the bearing portions 32b and the axis of the cylinder member bore 26m as shown in Figs. 1, 6, 7 and 9.

A projecting end portion 32c of inner shaft 32 is fitted to turn in a clamp sleeve extension 26n provided on member 26b which extends through the bearing block 26c spaced from the driven sprocket 27 as shown in Figs. 1 and 9, said sleeve extension 26n is split as at 26p to provide a resilient grip on end 32c and through suitable means, such as collar 36 and set screw 36a is mounted to turn with cylinder member 26b. Collar 36 may be of the expansion construction type which is clamped by the threaded screw 36b shown in Fig. 9. Terminating said shaft end 32c and mounted alongside collar 36 is an adjusting head or knob 37 which is secured in position by suitable means such as set screw 37a.

As shown in Fig. 4, suitable scale indicia 39 may be provided on the peripherical surfaces of the collar 36 and knob 37 to show relative set positions which may be calibrated to indicate the adjusted receptacle 26a capacities corresponding to the weight of the measured charges of tea, T, being delivered by mechanism 20.

The rotatable cylinder member 26b is closely fitted within a suitable housing formed of a backing frame 38 and a split front or cap portion 38a which are secured together in any suitable manner as by spaced dowels 38b and screws 38c, said housing rigidly retaining the bearing blocks 26c in the assembled alignment as shown in Figs. 1 and 8. The backing frame 38 may have an extended portion 38d to form the rear wall of chamber 23 as shown in Figs. 4, 6 and 9.

As seen from Figs. 1, 2, 4 and 8, the shimmying or shaker means is carried by the housing backing frame extension 38d and is seen to comprise a slide bar 40 which is retained for reciprocating motion by spaced straps 40a secured by screws 40b to the rear side of frame extension 38d. One end of the bar 40 carries a roller 40e in a groove 41a formed in the curved surface of rotary cam 41. The latter is formed to turn with a gear 42, and both are mounted to turn on a stationary headed shaft 43 which is rigidly carried from the front side of the frame extension 38d as shown in Figs. 1, 2 and 4. The slide bar 40 carries at spaced distance along the length thereof frontwardly projecting pins 40c which extend through opening 38e in extension portion 38d, the free ends of which each connect through short linkages 40d with the mid-portions of the exterior sides of one or two of the channel side walls 24b as shown in Figs. 1 and 4. The slide bar 40 is reciprocated by power supply through the meshing of gear 42 with a gear 44 mounted by set screw 44a to turn with driven sprocket 27 on the end of the cylinder member 26b. The lower ends of the channel side walls 24b below the portion thereof which are vibrated by said shimmying means may be firmly secured in position to align and register with the receptacles 26a when turned upwardly to receive charges of tea, T, by means of an anchoring plate 45 secured by screws 45a to the front side of frame extension 38d between each pair side walls 24b.

The front side of chamber 23 and the channels 24 may be covered by a glass plate 46 to allow visibility of the flow of tea T through the mechanism 20, said plate 46 being secured in place by cushioning bolts 46a as shown in Figs. 1 and 4.

From the assembled parts as described above and shown in the drawing, the practical utility of the invention will now be apparent. A controlled supply of bulk fluent material, T, is furnished in chamber 23 and will drop down to fill the channels 24.

The power transmission from the packaging machine through main shaft 30 and eccentrically mounted sprocket 29 will through chain 28 turn driven sprocket 27 in timed relation with the bag making and sealing of said packaging machine. The turning of sprocket 27 through meshed gears 44 and 42 and cam 41 reciprocates the slide bar 40 carrying the pins 40c and cause the channel side walls 24a to be vibrated through a shimmying action by the interconnection of said side wall 24a with the pins 40c through the linkage 40d. This results in shaking down the fluent material T into a relatively uniform compact body at the bottom end 24c of the channels 24. Meanwhile the cylindrical member 26b is being rotated with the turning of the driven sprocket 27 and when the receptacles 26a pass under their respective channels 24 the tea, T, therein is shaken down and fills each receptacle 26a during the continuous rotation of the cylindrical member 26b.

The tea, T, in passing from the outlets 24c of the channels 24 to the receptacles 26a flows in a relatively compact stream which the hardened steel receptacle segment wall 26f with cutting edge 26g readily severs during the continuous rotation of the member 26b. Such hardened wall structure 26f and cutting edge 26g not only is capable of resisting the wear thereof but also serves to minimize destructive abrasive action of any tea which may be ground between the relatively moving parts thereabout.

One feature of the invention is the provision of the variable speed drive for the cylindrical member 26b, that is, the automatic change of peripherical speed given the receptacles 26a during the filling and emptying thereof. As shown in Figs. 2 and 3, the combination eccentric mounting of the intermediate sprocket 29 on the main shaft 30 causes the sprocket 27 to provide a relatively slower speed of the receptacles 26a during the filling period, namely, when registering partly or wholly with the stream of tea flowing from the channel outlets 24c, the slowest peripherial speed being arranged to occur during full alignment position shown in Fig. 6. This condition takes place when the relative eccentric relation is as shown in Fig. 2. After the filling period the peripherial speed of the cylindrical member 26a increases to the maximum speed when receptacles 26a pass over the discharge chutes 21 at which time they are emptied. The aligned full discharge position of the receptacle 26a is as shown in Fig. 7, and the eccentric drive as indicated by dot and dash lines in Fig. 2. During said discharge of said receptacles 26a the cylindrical member 26b has turned 180 degrees from the fully aligned filling position after which the relative speed of said member 26b decreases until the filling period of the cycle is again reached. This variable speed drive has been found to give highly efficient and desirable operating characteristic, since the receptacles 26a are moved at a relatively slow or minimum speed during the filling period to assure uniformly measured charges while said charges are dumped during the discharge period at a relatively high or maximum speed taking advantage of the greater centrifugal force action then effective.

Preferably the inlet or top openings of each receptacle 26a corresponding to the outlet ends 24c of each channel 24 are substantially of the same cross-sectional shape and size so that they come into substantially exact register when aligned to take the full flow of the tea stream during the filling period of the receptacles 26a. This construction and arrangement permits filling of the receptacles 26a to be accomplished when the member 26b is travelling at its slowest speed and reduces to a minimum possible abrasive conditions due to any tea, T, particles being ground in between the moving parts.

The outlet channels 38f of the casing housing through which the T from receptacles 26a are discharged into chutes 21 however may each be a down tapered and preferably be of greater cross-sectional area than said top opening of the corresponding receptacle 26a, said casing outlets 38f being at least of greater length in the direction of rotation of the receptacles 26a than the corresponding dimensions of the latter as shown in Fig. 7. Thus the discharge of the tea, T, from the receptacles 26a is permitted to take place for a greater arc of travel of the receptacle 26a when the same is rotating at its highest peripherial speed thereby accelerating the discharge and increasing the effective dumping or emptying period when the maximum centrifugal force is applied thereby eliminating the necessity of providing other expulsion means which would complicate the present otherwise simplified construction.

The capacities of the receptacles 26a and consequently the amount of each filling or charge may be increased or decreased within wide limits by adjusting the knob 37, first releasing the collar clamp screws 36b and turning the knob 37, with respect to the collar 36, the indicia scale 39, showing the setting desired which may be calibrated to indicate fractions of a pound where mechanism 20 is used for packaging tea balls. Turning said knob 37, with respect to the collar 36, and member 26b, rotates the inner shaft 32, which varies the position of the crank portions 32a, in slots 26k, for lowering or raising bottom piece 26j. The clamp screws 36b are again tightened and the desired capacities of all the receptacles 26a are thus set which corresponds to weight measurements indicated at the scale 39.

The mechanism 20 can be made in single or multiple construction with one or more receptacles 26a incorporated in the cylindrical member 26b. When constructed with a plurality of receptacles 26a operating in unison to deliver uniform quantities of charges of the fluent material T, for packaging as shown in the drawing, all the receptacles 26a can be adjusted to a preset desired amount by the use of the single knob 37 means as described above. The parts of said mechanism 20 are therefore most compactly arranged for operation on continuous rotation of the member 26b.

In actual test, mechanism 20 has been found to have the exceedingly high output capacity of delivering over 100 uniformly measured charges per minute per receptacle 26a. An installation with four receptacles 26a as here disclosed, is capable of supplying about 450 such measured charges per minute under steady factory operating conditions. Thus by adding in the construction one receptacle 26a more or less the structure is increased or decreased very little yet the capacity output is materially changed thereby lending the invention to construction for either single medium, or multiple fast or super high speed packaging machines.

It is thus seen that there is provided a mechanism in which the several objects of this invention are achieved and which are well adapted to meet conditions of practical use.

As various possible embodiments might be made of the above invention, and as various changes might be made in the embodiment above set forth, it is to be understood that all matters herein set forth or shown in the accompanying drawings are to be interpreted as illustrative and not in a limiting sense.

Having thus described my invention, I claim as new and desire to secure by Letters Patent:

1. A mechanism of a bag packaging machine of the character described for measuring filler charges comprising a supply source of fluent material including a chamber, a cylindrical member mounted for rotation below said chamber having a receptacle extending therein, a bottom piece adjustably mounted in said receptacle for predetermining the capacity of the latter, an elongated channel extending from said chamber wherethrough the fluent material intermittently flows into the receptacle, opposite walls of said channel being formed of a flexible material, means for vibrating said walls to agitate the flow of the passing fluent material therethrough and to prevent clogging, means below said member for receiving the discharge of the measured fluent material from the receptacle, means for rotating said member at variable speeds during each revolution and actuating said vibrating means, and means extending from said member for pre-setting the adjustment of said bottom piece to a desired charge quantity.

2. A mechanism of a bag packaging machine of the character described for measuring filler charges comprising a supply source of fluent material including a chamber, a cylindrical member mounted for rotation below said chamber having a receptacle extending therein, a bottom piece adjustably mounted in said receptacle for predetermining the capacity of the latter, an elongated channel extending from said chamber wherethrough the fluent material intermittently flows into the receptacle, opposite walls of said channel being formed of a flexible material, means for vibrating said walls to agitate the flow of the passing fluent material therethrough and to prevent clogging, means below said member for receiving the discharge of the measured fluent material from the receptacle, means for rotating said member and for actuating said vibrating means, means extending from said member for setting the adjustment of said bottom piece to a predetermined charge, the channel having an outlet adapted to align with an opening of said receptacle, said outlet and opening being substantially of the same cross-sectional shape and size, said discharge means having greater cross-sectional area than said receptacle opening, and a variable speed driving means forming part of the means for rotating said member to give maximum and minimum peripherial speeds to said member during the period of discharge of said material from the receptacle and during the period of filling respectively, said receptacle being formed with a removable hardened wall portion located to cut the stream of material flowing from the channel to the receptacle and serving as an abrasive resistant.

3. A mechanism of a bag packaging machine of the character described for measuring filler charges including a cylindrical member formed with a receptacle, means for mounting said member for rotating said receptacle, and a power drive for continuously turning said rotating means at variable speeds comprising a main drive shaft, a sprocket mounted eccentrically to turn with the drive shaft, a driven sprocket mounted to turn said member, a chain for transmitting power from the drive sprocket to the driven sprocket and an idler sprocket resiliently mounted to take-up the chain slack, said receptacle being so constructed and arranged to have a filling period take place at a less speed of said member than during a discharging period thereof.

4. A mechanism as defined in claim 3 in which said mounting means includes a casing frame formed with an outlet through which the receptacle is discharged, said outlet having a greater cross-sectional area than the receptacle.

5. A mechanism of a bag packaging machine of the character described for measuring filler charges comprising a supply source of fluent material including a chamber, a cylindrical member mounted for rotation below said chamber having a receptacle extending therein, a bottom piece adjustably mounted in said receptacle for predetermining the capacity of the latter, an elongated channel extending from said chamber wherethrough the fluent material intermittently flows into the receptacle, opposite walls of said channel being formed of a flexible material, means below said member for receiving the discharge of the measured fluent material from the receptacle, and means for rotating said member at variable peripherial speeds during each revolution and for actuating said channel walls.

6. In a feed measuring mechanism of the character described, a unitary cylindrical member having an axial bore and a plurality of longitudinally spaced receptacles extending in from the periphery of said member, bearings for rotatably mounting said member, power driving means mounted on one end of said member and beyond one of the bearings for continuously rotating same, an inner shaft movably fitted to extend through said bore short of said last mentioned bearing, a bottom piece slidably mounted in each of said receptacles engaged directly with said shaft for retaining same in set position to predetermine the receptacle capacity, means extending beyond the other one of said bearings opposite the end of the mounting of said power driving means for adjusting said shaft in the bore with relation to said members to retain each bottom piece in position of a desired receptacle capacity, and means carried by the shaft and member beyond said other bearing to indicate the adjusted capacity.

7. A mechanism of a bag packaging machine of the character described for measuring filler charges comprising a chamber for a supply source of fluent material, a cylindrical member mounted for rotation below said chamber having a receptacle extending therein, inlet means communicating said chamber with the receptacle during a portion of a revolution of said member whereby fluent material intermittently flows into the receptacle, outlet means for discharging the fluent material from the receptacle spaced from said inlet means, a variable speed driving means for continuously rotating said member connected to produce a maximum peripherial speed during the discharge of the receptacle into the outlet means, said cylindrical member being formed with a plurality of longitudinally spaced receptacles having bottom pieces adjustably mounted therein, and presetting means extending through said member for adjusting all of said pieces simultaneously to a desired capacity.

8. A mechanism of a bag packaging machine of the character described for measuring filler charges comprising a supply source of fluent material including a chamber, a cylindrical member mounted for rotation below said chamber having a plurality of receptacles extending therein, a bottom piece adjustably mounted in each of said receptacles for predetermining a charge capacity thereof, elongated channels extending from said chamber wherethrough the fluent material intermittently flows to fill the receptacles through openings thereof, means below said member for receiving discharges of the measured fluent material from each of the said receptacles, means for rotating said member in a constantly forward motion, said discharge receiving means having inlets for aligning with said openings of said receptacles during the rotation thereof, each of the discharge receiving inlets having greater length in the direction of rotation of the receptacles than the corresponding length dimension of said receptacle openings, and variable speed driving means forming part of said means for rotating said member constantly connected thereto to give maximum and minimum peripherial speeds to said member during a period of discharge of said material from the receptacles when moving into and out of an alignment with respect to said discharge receiving inlets and during a period of filling respectively, said maximum speed exerting centrifugal force during the entire discharge of all material from the receptacles of the rotating member, each receptacle having a removable hardened wall portion located to present an abrasive resistant cutting edge to a stream of material flowing from the channel to the receptacles.

9. A mechanism of a bag packaging machine for measuring filler charge comprising a supply source of fluent material, means for measuring successive uniform charges of said material flowing from said supply source including a plurality of movable receptacles each having a common inlet and outlet portion for receiving a measured charge during one period of its movement and discharging same for packaging during another period, and a driving means constantly connected for continuously moving said member with the receptacles from and during said receiving period and during the discharging period, said moving means having a variable speed for continuously rotating the receptacles in a constantly forward motion so that the speed during the charge receiving period is less than the speed at said discharging period, said discharging speed exerting centrifugal force of expulsion of said charges from the receptacles during the entire discharging period.

10. A mechanism of a bag packaging machine of the character described of measuring filler charges comprising a supply source of fluent material including a chamber, a cylindrical member mounted for rotation below said chamber having a receptacle extending therein, a bottom piece adjustably mounted in said receptacle for predetermining charge capacity thereof, an elongated channel extending from said chamber through which the fluent material intermittently flows into said receptacle through an opening thereof, discharge means below said member for receiving a measured charge of said fluent material from the receptacle, means for rotating said member in a constantly forward motion, said discharge means having an inlet of greater length in the direction of rotation of the member than an corresponding length of said receptacle opening, and variable speed driving means forming part of said means for rotating said member constantly connected therewith for producing speed to exert centrifugal force effective during the entire period of discharge of the material from the receptacle and at a rate to exceed sixty discharges per minute.

11. A mechanism of a bag packaging machine of the character described for measuring filler charges comprising a chamber for a supply source of fluent material, a cylindrical member mounted for rotation below said chamber having a plurality of receptacles extending therein, inlet means communicating said chamber with the receptacles during a portion of a revolution of said member whereby fluent material intermittently flows therein, outlet means for receiving discharges of the fluent material from the receptacles spaced from said inlet means, a constantly connected variable speed driving means for continuously rotating said member in a constantly forward motion to produce a maximum peripherial speed during the discharge of said receptacles into the outlet means, said inlet means including power-driven accelerating means for advancing the flow of the fluent material from the chamber to the receptacles in excess of that produced by gravity, the variable speed driving means during said maximum speed of the member exerting centrifugal force for expelling all the fluent material from the receptacles.

HANS O. IRMSCHER.

REFERENCES CITED

The following references are of record in the file of this patent:

UNITED STATES PATENTS

| Number | Name | Date |
|---|---|---|
| 507,177 | Smith | Oct. 24, 1893 |
| 774,326 | Kelly | Nov. 8, 1904 |
| 890,190 | Stephens | June 9, 1908 |
| 1,086,814 | Gardiner | Feb. 10, 1914 |
| 1,165,508 | Irish | Dec. 28, 1915 |
| 2,332,558 | Colburn | Oct. 26, 1943 |
| 2,339,908 | Brewer | Jan. 25, 1944 |

FOREIGN PATENTS

| Number | Country | Date |
|---|---|---|
| 81,360 | Germany | May 31, 1895 |